United States Patent
Muller

[15] 3,670,807
[45] June 20, 1972

[54] STORAGE TYPE HOT WATER HEATING SYSTEM

[72] Inventor: John T. Muller, Nutley, N.J.
[73] Assignee: Leslie Co., Lyndhurst, N.J.
[22] Filed: Sept. 4, 1968
[21] Appl. No.: 757,236

[52] U.S. Cl. ............................ 165/39, 126/366, 165/132, 236/12, 236/21, 236/23, 236/25
[51] Int. Cl. ....................................... G05d 23/13
[58] Field of Search ............... 165/39, 132; 126/366; 236/17, 236/21, 23, 12, 25; 122/32

[56] References Cited

UNITED STATES PATENTS

| | | | |
|---|---|---|---|
| 1,991,863 | 2/1935 | Morrow | 236/21 X |
| 2,006,035 | 6/1935 | Stewart | 236/23 |
| 2,296,325 | 9/1942 | Bak | 236/23 X |
| 2,852,196 | 9/1958 | Spence | 236/24 X |
| 3,172,601 | 3/1965 | Caparone | 236/21 |
| 3,232,336 | 2/1966 | Leslie et al. | 165/38 |
| 3,387,246 | 6/1968 | Grayson | 236/21 X |
| 3,133,590 | 5/1964 | Lowe | 165/132 X |

Primary Examiner—Albert W. Davis, Jr.
Attorney—Pennie, Edmonds, Morton, Taylor & Adams

[57] ABSTRACT

A hot water heating system which includes a storage tank with a specially arranged heat exchanger therein, together with at least one blending valve and a valve for controlling the heat supply to the heat exchanger, and also including a fluid connection whereby a change in demand for blended hot water from the blending valve causes an instantaneous change in the heat supplied to the tank which is proportional to the change in demand and takes place before any material change in the temperature of the water flowing from the tank to the hot water blending valve.

3 Claims, 1 Drawing Figure

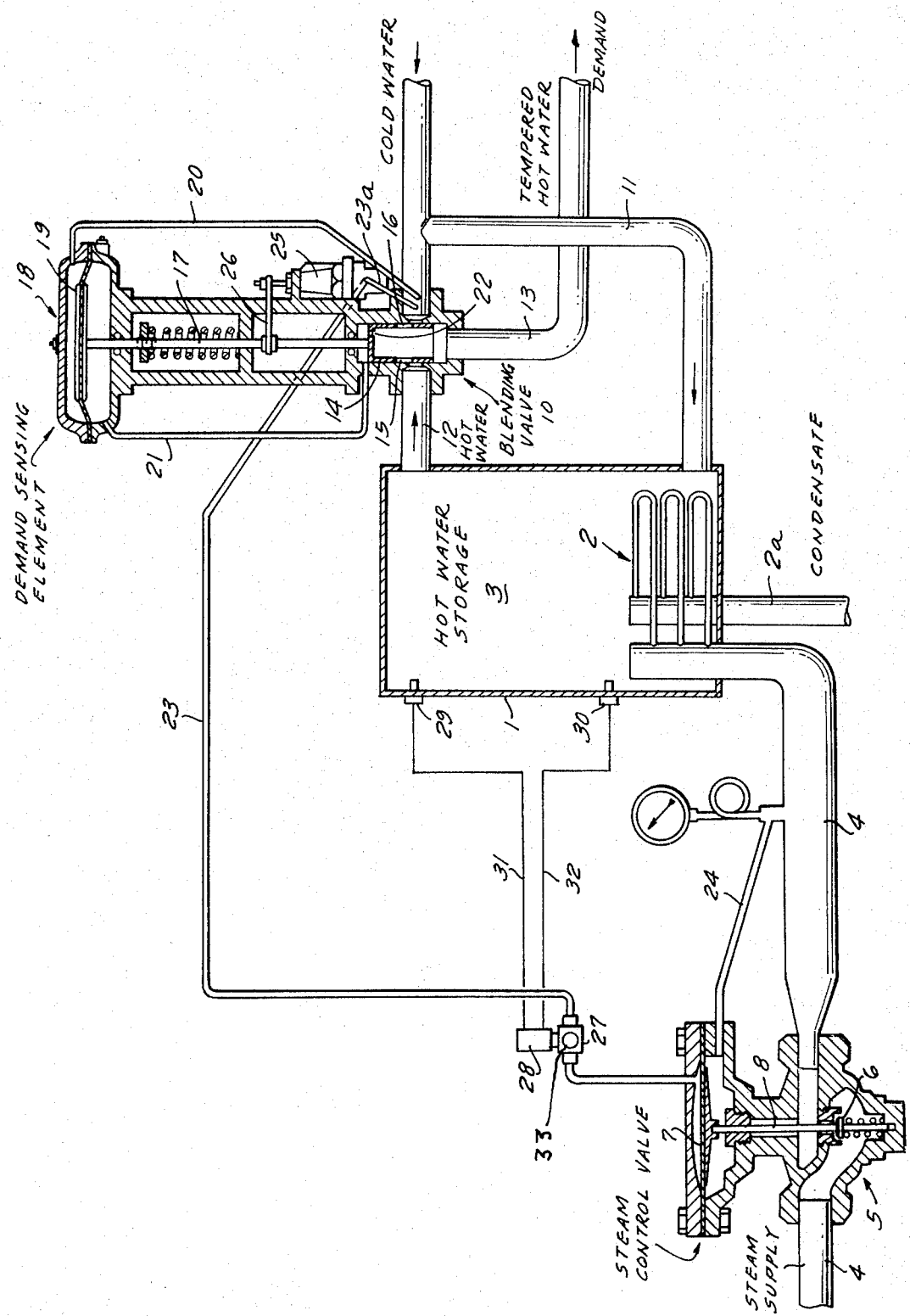

STORAGE TYPE HOT WATER HEATING SYSTEM

BACKGROUND OF THE INVENTION

In conventional hot water heating circuits utilizing a heat exchanger and a thermal sensing feedback system to regulate the heat supply to the heat exchanger in response to demand, it is customary to encounter cycling of the output temperature as a result of thermal lags in the system. This is caused by the time lag which occurs between a corrective action on the steam side and the results of the correction on the liquid side of the exchanger. Under certain conditions, this results in an out-of-phase relationship between the flow demands placed on the exchanger and the steam applied to the exchanger. The magnitude of the out-of-phase condition varies with the heater construction, the rate of flow through the heater, the manner of installing the thermal sensing element, the size and mass of the sensing element, the materials of construction of the sensing element, and the location of the thermal sensing element in the liquid circuit.

Overheating of the water contained in the heater is an objectionable characteristic of most hot water heating systems. Dangerous overheating can be caused by an erroneous signal resulting from cooling down of the liquid system when the system is at or near the no-flow condition. The cooling down of the liquid adjacent to the thermal sensing device causes it to indicate to the steam control valve, that steam is required to be supplied to the heater to restore the temperature. Since, at very low flows or at the no-flow condition, the thermal element is unable to feel the effects of its changes supplied to the heat exchanger, it causes steam to be supplied to the heater at a pressure which should normally correspond to a maximum flow rate, despite the fact that the no-flow condition may exist.

The result of this action is that the stored water is heated to the saturation condition and, as a result, when a subsequent demand is placed upon the heater after a period of no demand, excessively hot water at saturation temperature is supplied to the demand system representing a hazard to personnel. At this time, the thermal sensing system is subjected to water at elevated temperature considerably above its set point, and responds with a signal to cut off the steam supply. Despite the fact that there is an increase in demand for water, it may cut off the steam to correspond to a no-flow demand. This off condition of the steam supply will continue until all of the overheated water contained in the heat exchanger is dissipated, at which time the element will be subjected to cold water below the set point. Because of the time lag, this type of control action results in violent swings of water temperature, unless very wide proportional bands are employed. Such bands produce wide temperature variations between low and high flows.

Various modes of sophisticated feedback control, plus methods of recirculating to permit the element to feel the condition which exists in the heater, have been used at considerably increase in equipment cost, size, and complexity, the degree of success being largely related to the complexity and cost.

Because large storage heaters are costly and require considerable space, attempts have been made to produce heaters of somewhat reduced storage capacity, but having sufficiently large heating surface, to obtain advantages of both the storage and instantaneous types. This approach is less costly than the large storage type heater system, but still suffers from the problems of heat transfer lags and adequate sensing of temperature condition. Location of the thermal sensing element is still a compromise and an important consideration in getting acceptable results because it must still wait for an error to occur before producing a corrective action. Even when costly systems of continuous recirculation are employed, there is no way to avoid the time lag associated with heat transfer, in other words response to a change can never be instantaneous when it depends on heat transfer to take place. In an attempt to anticipate demand changes, various techniques of introducing cold water from the inlet into the location of the thermal sensing bulb have been used, and have been a partial improvement but still predominantly act like an error correcting system which relies on first making the error, and then attempting to correct or hold it to a minimum.

SUMMARY OF THE INVENTION

The storage hot water system of the invention includes a storage tank having a heat exchanger at the bottom thereof which occupies only a small proportion of the height of the tank, leaving an extensive body of hot water between the heat exchanger and the outlet for hot water at the top of the tank. A blending valve is provided receiving cold water from a cold water supply line and hot water from the hot water outlet of the tank. Also a control valve is arranged in the steam, or other heat supply line. Means are provided for relating the operation of the heat control valve to the action of the blending valve.

With this arrangement at a demand for tempered hot water the blending valve is automatically opened and its connection with the steam supply valve causes this valve to open and supply steam to the heating element instantaneously with the appearance of the demand. The opening of the steam valve is in proportion to the demand so that the heat supply is also proportional to the demand. The hot water which passes from the top of the tank through the blending valve is at a predetermined temperature maintained in the tank and the supply of heat to the heating element at the bottom of the tank takes place proportionately before any temperature change takes place in the water withdrawn through the blending valve.

BRIEF DESCRIPTION OF THE DRAWING

The single FIGURE is a schematic diagram of the hot water heating system of the present invention.

DESCRIPTION OF THE PREFERRED EMBODIMENT

Referring to this drawing the apparatus includes a tank 1 which advantageously is an upright tank, and at the bottom thereof is a heat exchanger 2. This exchanger is made to occupy a limited space vertically of the tank so as to leave a comparatively large hot water storage space 3 above the exchanger.

Heat exchanger 2 is supplied with heating steam by a steam supply line 4 in which is included a steam control valve 5. In this valve the valve member 6 is actuated by means of a diaphragm 7 through a stem 8. The condensate from exchanger 2 is discharged through a pipe 2a.

A cold water supply line 9 is connected to the cold water inlet of blending valve 10 and through a branch line 11 to the cold water inlet at the bottom of hot water tank 1. Hot water is supplied to the blending valve 10 through a connection 12 from the hot water outlet at the top of tank 1. The hot and cold water supplied to blending valve 10 are mixed therein in predetermined proportions and flow out of the valve outlet pipe 13 to the apparatus which utilizes the blended or tempered hot water, that is, to the hot water demand.

Blending valve 10 may be constructed as shown for example in U.S. Pat. No. 3,232,336 assigned to the same assignee as the present application. Accordingly valve 10 includes a hollow cylinder 14 which slides in a chamber or cavity within the valve casing and is provided with suitable ports 15 and 16 for proportioning the hot and cold water. Cylinder 14 is actuated by a stem 17 and a demand sensing element 18 having a flexible diaphragm 19 mounted within a closed casing.

For the purpose of actuating the demand sensing element 18 according to the demand for tempered hot water a cold water connection 20 is provided in the form of a tube extending from the cold water inlet of valve 10 to the upper side of diaphragm 19. Also the lower side of this element is connected through a tube 21 with the upper end of the cavity in which cylinder 14 operates and hence with the hot water outlet of the blending valve. A pressure equalizing opening 22 is arranged in the head of valve cylinder 14 to permit free movement of the valve member in its chamber, and thus the water pressure acting through tube connection 21 on the lower surface of the diaphragm 19 corresponds to the pressure of the temperate hot water on the outlet side of the blending valve.

In order to control the actuation of the steam supply valve 5 the upper side of its actuating diaphragm 7 is connected through a tube 23 to the outlet side of a pressure reducing valve 25 (at the right of the drawing), and the inlet side of valve 25 is connected through tube 23a to the cold water inlet to blending valve 10. The lower side of diaphragm 7 is connected through tube 24 to the outlet of steam control valve 5, that is, to the steam supply pipe 4 between valve 5 and heat exchanger 2. Pressure reducing valve 25 is mounted on one side of the frame of blending valve 10 and mechanically controlled by an arm 26 which is secured to and projects laterally from stem 17 of the blending control element 18. Pressure reducing valve 25 produces a steam pressure in steam supply pipe 4 which is proportional to the demand for tempered water placed on the system.

The temperature of the hot water in the storage space 3 of tank 1 is limited at some desired maximum, for example, 190° F. As shown this is accomplished by means of a thermostat 29 at the top of tank 1 which controls the electromagnet 28 of a three-way valve 27 in tube 23. This valve has a vent 33 which is connected to a drain not shown. If desired a second thermostat 30 may be mounted near the bottom of tank 1. The switches of thermostats 29 and 30 are connected in the circuit of operating coil 28 through conductors 31 and 32 respectively.

In the operation of this apparatus a change in the demand for tempered hot water causes an instantaneous change proportional to such demand in the control valve 5 for the steam supply.

This instantaneous operation of steam valve 5 which is proportionate to the change in demand for tempered hot water compels the heat exchanger 2 to produce hot water at a rate related to its use. This action takes place before any temperature change actually takes place in the hot water delivered by the storage tank to the blending valve.

I claim:
1. In a hot water heating system having:
   a. a steam heating means for water,
   b. a valve for the steam supply to the heating means,
   c. a blending valve constructed to blend hot and cold water in any desired predetermined proportions,
   d. a water storage tank,
   e. a cold water connection for supplying cold water both to the blending valve and to the inlet of said tank,
   f. a blending control element connected to the blending valve for controlling the rate of flow of hot and cold water through the blending valve,
   g. a fluid connection between one side of said control element and the cold water inlet to the blending valve,
   h. a fluid connection between the opposite side of the blending control element and the outlet side of the blending valve,
   i. a control element for the steam valve,
   j. a fluid connection between the cold water inlet side of the blending valve and one side of the steam control element,
   k. a pressure reducing valve in said last fluid connection,
   l. a control connection between the blending valve control element and said pressure reducing valve, and
   m. a fluid connection between the outlet side of the steam valve and the opposite side of the steam control element, the improvement in combination therewith which comprises:
   n. said hot water storage tank having a cold water inlet close to the bottom thereof and a hot water outlet near the top thereof, and
   o. said steam heating means for the water having a restricted upright dimension within the water storage tank adjacent the bottom thereof and leaving an extensive body of hot water between said heating means and said hot water outlet so that a demand for blended water causes the instantaneous activation of the steam valve to supply steam to said water heating means before any material temperature change takes place in the water in the storage tank withdrawn through the blending valve.

2. A hot water heating system as set forth in claim 1 wherein the fluid connection between the cold water inlet side of the blending valve and one side of the steam control element includes an electromagnetic valve having an operating electric circuit and a temperature responsive switch connected in said circuit, said steam control element being activated when the electric circuit is closed by said temperature responsive switch thereby causing the steam control element to shut off the steam supply to the water heater, said switch being disposed in operative association with the body of hot water within said storage tank near the top thereof so as to limit the upper temperature of said water.

3. A hot water heating system as set forth in claim 1 wherein the hot water storage tank is elongated in shape and upright in position.

* * * * *